United States Patent
Lee et al.

(10) Patent No.: US 10,502,366 B2
(45) Date of Patent: Dec. 10, 2019

(54) OIL INJECTION APPARATUS

(71) Applicant: KLT CO., LTD., Paju-si, Gyeonggi-do (KR)

(72) Inventors: Seung-heon Lee, Suwon-si (KR); Deok-beum Lee, Seoul (KR)

(73) Assignee: KLT CO., LTD. (KR)

( * ) Notice: Subject to any disclaimer, the term of this patent is extended or adjusted under 35 U.S.C. 154(b) by 276 days.

(21) Appl. No.: 15/635,672

(22) Filed: Jun. 28, 2017

(65) Prior Publication Data
US 2018/0149309 A1    May 31, 2018

(30) Foreign Application Priority Data
Nov. 30, 2016 (KR) .................... 10-2016-0162160

(51) Int. Cl.
| | |
|---|---|
| *F16N 13/14* | (2006.01) |
| *F16N 7/38* | (2006.01) |
| *F16N 11/08* | (2006.01) |
| *F16N 13/04* | (2006.01) |
| *F16N 13/06* | (2006.01) |

(52) U.S. Cl.
CPC ............ *F16N 13/14* (2013.01); *F16N 7/385* (2013.01); *F16N 11/08* (2013.01); *F16N 13/04* (2013.01); *F16N 2013/063* (2013.01); *F16N 2210/12* (2013.01); *F16N 2210/14* (2013.01); *F16N 2210/16* (2013.01); *F16N 2210/18* (2013.01)

(58) Field of Classification Search
CPC ............ F16N 13/14; F16N 7/385; F16N 11/08
USPC .......................................................... 184/6.4
See application file for complete search history.

(56) References Cited

U.S. PATENT DOCUMENTS 5,634,531 A * 6/1997 Graf .................. F16N 11/08
184/37
5,662,023 A * 9/1997 Carson ................ F01B 29/00
184/7.4

(Continued)

FOREIGN PATENT DOCUMENTS

| KR | 10-0637395 B1 | 10/2006 |
|---|---|---|
| KR | 10-2011-0104773 A | 9/2011 |
| KR | 10-1546379 B1 | 8/2015 |

OTHER PUBLICATIONS

Korean Office Action (KR 10-2016-0162160), KIPO, dated Jun. 18, 2018.

(Continued)

*Primary Examiner* — Michael R Mansen
*Assistant Examiner* — Mark K Buse
(74) *Attorney, Agent, or Firm* — Park & Associates IP Law, P.C.

(57) ABSTRACT

An oil injection apparatus includes: a storage unit extruding lubricating oil through an ejection hole formed at a lower end thereof; a discharge unit communicating with the storage through the ejection hole and discharging the lubricating oil outside according to a pumping operation; a plurality of discharge pumps arranged at regular intervals in a circumferential direction of the discharge unit and having respective first ends disposed in the discharge unit; and a driving unit rotating in a direction to sequentially press the first ends of the discharge pumps, which are disposed in the discharge unit, thereby causing the discharge pumps to perform the pumping operation in turn.

11 Claims, 9 Drawing Sheets

(56) References Cited

U.S. PATENT DOCUMENTS

| | | | | |
|---|---|---|---|---|
| 6,244,387 B1* | 6/2001 | Paluncic | ................ | F16N 25/02 |
| | | | | 184/105.1 |
| 6,354,816 B1* | 3/2002 | Yang | ..................... | F16N 11/08 |
| | | | | 184/37 |
| 7,228,941 B2* | 6/2007 | Weigand | ................ | F16N 11/08 |
| | | | | 184/7.4 |
| 8,435,016 B2* | 5/2013 | Telakowski | ......... | F04C 18/0215 |
| | | | | 184/6.16 |
| 8,783,418 B2* | 7/2014 | Orlitzky | ................ | F16N 13/14 |
| | | | | 184/37 |
| 8,978,825 B2* | 3/2015 | Conley | .................. | F16N 7/385 |
| | | | | 184/6 |
| 9,127,809 B2* | 9/2015 | Conley | ................ | F16N 39/002 |
| 9,151,443 B2* | 10/2015 | Orlitzky | ................ | F16N 11/08 |
| 2002/0079335 A1* | 6/2002 | Kramer | .................. | F16N 11/08 |
| | | | | 222/333 |
| 2016/0334058 A1* | 11/2016 | Yang | ..................... | F16N 11/08 |

OTHER PUBLICATIONS

Korean Decision to Grant (KR 10-2016-0162160), KIPO, dated Sep. 6, 2018.

* cited by examiner

OIL INJECTION APPARATUS

REFERENCE TO RELATED APPLICATIONS

This application claims the priority benefit of Korean Patent Application No. 10-2016-0162160 filed on Nov. 30, 2016, the entire contents of which are incorporated herein by reference.

FIELD OF THE INVENTION

The present invention generally relates to an oil injection apparatus. More particularly, the present invention relates to an oil injection apparatus that is provided at a location which requires lubricating due to mechanical friction, thereby enabling automatic injection of lubricating oil to the location.

BACKGROUND OF THE INVENTION

An oil injection apparatus used for a typical industrial machine, specifically at a location at which mechanical friction occurs, has become widespread and is now being used in many industrial fields. Although the use of the oil injection apparatus is increasing, many problems associated with the use of the oil injection apparatus occur in industrial sites for reasons described below.

An oil injection apparatus is a device for injecting lubricating oil, i.e. grease, which is made up of a thickener, a base oil, and an additive that are combined physically but not chemically. The thickener is analogous to a sponge and oil is analogous to water. That is, the thickener holds oil as a sponge holds water. When a soaked sponge is squeezed, the sponge releases water. Likewise, when predetermined pressure or stress is applied to grease, oil separation occurs. Measurement of the oil separation is referred to as bleed rate. The higher the bleed rate, the more easily oil separates from the thickener.

There are two types of oil injection apparatuses according to a method of applying pressure to grease to discharge oil. One is a gas discharge method that usually uses nitrogen or hydrogen gas, in which when nitrogen or hydrogen gas is generated by a gas generation device, the generated gas constantly applies pressure to a piston and grease is discharged by the pressure. When the gas continuously presses the piston for a long time, ranging from one month to one year, most of oil is separated from grease and is gradually discharged out of a container. In the end, only a thickener is left and hardened in the container like mud. That is, oil separation progresses to a point at which no oil comes out of the container regardless of the pressure of gas. In this case, since the grease may be misperceived to remain in the container, grease shortage is not properly detected. This is likely to lead to bearing damage.

In order to solve this problem of the gas discharge method, a mechanical discharge method has been developed. There are two mechanical discharge methods widely used in various industrial fields. One is a screw down system and the other is a positive displacement pump system. The screw down system is advantageous over the positive displacement pump system in terms of the bleed rate, but has a limitation in that it has a low grease discharge pressure.

A conventional art of the screw down system is disclosed in U.S. Pat. No. 7,228,941 B2. According to the convention art, a wedge-shaped slide surface is attached to a lower portion of a gear wheel. When the gear wheel rotates, a ram moves up and down along an opposing wedge-shaped slide surface that is connected to the ram and positioned under the wedge-shaped slide surface. As the ram moves up and down, grease is compressed and discharged outside. This oil injection apparatus has a complicated structure and is high in manufacturing cost and energy consumption. Further, since it is necessary to lift the wedge slide with the force of a spring, when flowability of grease is poor due to low temperature or high viscosity of the grease, resistance increases, leading to fluctuation in the amount of grease discharged.

The positive displacement pump system has been developed to solve the problem of the screw down system. The positive displacement pump system takes in and compresses grease by connecting a pump to a small motor. The discharge pressure is increased in this way. This method has an advantage of obtaining a high discharge pressure. However, since a spring continuously presses down grease such that grease can be efficiently introduced into a pump, separation of oil occurs at a certain point as with the gas discharge method. When the oil separation occurs, flowability of grease is deteriorated, and thus the grease cannot be efficiently introduced into the pump. For this reason, an injection hole is likely to clog and grease discharge is stopped.

SUMMARY OF THE INVENTION

Accordingly, the present invention has been made keeping in mind the above problems occurring in the related art, and an object of the present invention is intended to propose an oil injection apparatus capable of simultaneously extruding and pumping lubricating oil with a single power source, and being provided with a clutch function to deal with a change in oil pressure attributable to a difference between the amount of lubricating oil transferred through extrusion and the amount of lubricating oil discharged through pumping.

Technical problems that can be solved by the invention are not limited to the above problem, and other technical problems that are not mentioned herein also can be clearly understood by those who ordinarily skilled in the art from the following detailed description.

In order to accomplish the above object, according to one aspect, there is provided an oil injection apparatus including: a storage unit extruding lubricating oil stored therein through an ejection hole formed at a lower end thereof; a discharge unit communicating with the storage unit through the ejection hole, and discharging the lubricating oil supplied from the storage unit outside according to a pumping operation; a plurality of discharge pumps arranged at regular intervals in a circumferential direction of the discharge unit, the discharge pumps having first ends disposed inside the discharge unit; and a driving unit rotating to sequentially press the first ends of the discharge pumps disposed in the discharge unit, thereby causing the discharge pumps to perform the pumping operation in turn.

Preferably, each discharge pump includes: a cylinder with a second end disposed outside the discharge unit; and a piston engaged with a first end of the cylinder and provided with at least one intake hole to take the oil in therethrough, in which at least part of the piston is moved inward and outward in the cylinder according to force applied by the driving unit, thereby pumping the lubricating oil introduced through the intake hole in a first direction that is directed to the second end of the cylinder.

Preferably, the piston and the cylinder communicate with each other, thereby providing a channel through which the lubricating oil is discharged, and at least one check value is provided in the channel to prevent the lubricating oil from flowing in a second direction reverse to the first direction.

Preferably, the at least one check value includes: a first check valve provided in the channel of the piston and disposed to be close to the intake hole; and a second check valve provided in the channel of the cylinder and disposed to be spaced from the piston in the first direction when the piston is most deeply moved inward in the cylinder, in which when the piston is inserted into the cylinder, the first check valve moves in the second direction to close the intake hole, and the second check valve moves in the first direction to open the channel of the cylinder.

Preferably, when the piston is moved out of the cylinder, the first check valve moves in the first direction to open the intake hole and the second check valve moves in the second direction to close the channel of the cylinder.

Preferably, a fixed member is provided at one side of the check valve in the first direction to limit a movement range of the check valve.

Preferably, the discharge pump further includes a spring having a second end connected to an internal portion of the cylinder and a first end connected to an internal portion of the piston, in which the spring provides elastic force acting in the second direction reverse to the first direction.

Preferably, the driving unit includes: a rotary body connected to a driving force generator to receive rotational force from the driving force generator; and a pressurizing rotor asymmetrically protruding from an outer circumferential surface of the rotary body to sequentially press the first ends of the discharge pumps by eccentrically rotating according to rotation of the rotary body.

A screw shaft interlockingly rotating with the driving unit and a second piston engaged with the screw shaft are provided in the storage unit, in which the second piston down according the rotation of the screw shaft in a first direction, thereby pressing the lubricating oil down in the storage unit.

Preferably, when the screw shaft is rotated in a second direction reverse to the first direction, the second piston disengages from the screw shaft, thereby not moving up and down according to the rotation of the screw shaft.

Preferably, an upper surface of the second piston is provided with an engagement recess. When a protrusion protruding from a lower surface of a nut member that is provided to rotate along an outer circumferential surface of the screw shaft is inserted into the engagement recess, the screw shaft engages with the second piston. Therefore, when the screw shaft is rotated in the second direction, the protrusion of the nut member escapes from the engagement recess, and thus the second piston disengages from the screw shaft.

The protrusion of the nut member and the engagement recess have a cross section having a polygonal shape.

According to the present invention, lubricating oil is primarily compressed and extruded by a piston, and then secondarily compressed and pumped out by a discharge pump. Therefore, it is possible to overcome problems of a low discharge pressure of a screw down pressurization method.

In addition, according to the present invention, it is possible to perform a stable pumping operation by blocking back pressure of the lubricating oil, occurring due to the pumping operation of the discharge pump, using multiple check valves.

In addition, according to the present invention, it is possible to supply lubricating oil to a plurality of spots using a single oil injection apparatus provided with a plurality of discharge pumps.

In addition, according to the present invention, it is possible to prevent stagnation of the lubricating oil, attributable to a difference between the amount of lubricating which is introduced and the amount of oil which is discharged outside, by using a clutch function by which a first gear intermittently meshes with a second gear, thereby reducing oil separation of the lubricating oil attributable to long term compression of the lubricating oil.

In addition, according to the present invention, since extrusion and pumping of the lubricating oil can be performed by a single power source, the oil injection apparatus has a simple and compact structure. Therefore, the oil injection apparatus can reduce manufacturing cost and an installation space.

BRIEF DESCRIPTION OF THE DRAWINGS

The above and other objects, features and other advantages of the present invention will be more clearly understood from the following detailed description when taken in conjunction with the accompanying drawings, in which:

FIGS. 6A to 7B are views illustrating exemplary operation states of the discharge pump of the oil injection apparatus according to the embodiment of the invention.

DETAILED DESCRIPTION OF THE INVENTION

Hereinbelow, exemplary embodiments of the present invention will be described in detail with reference to the accompanying drawings. Throughout the drawings, like reference numerals will refer to like parts. Repeated descriptions and descriptions of known functions and configurations which have been deemed to unnecessarily obscure the gist of the present invention will be omitted below. Although exemplary embodiments of the present invention are described below, the invention may be embodied in many alternate forms by a person skilled in the art without departing from the spirit of the invention and should not be construed as limited to only the embodiments set forth herein.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

It will be understood that, although the terms first, second, A, B, (a), (b), etc. may be used herein to describe various elements, these elements should not be limited by these terms. These terms are used to distinguish one element from another. Thus, a first element discussed below could be termed a second element without departing from the teachings of the inventive concepts.

Figure 1A:
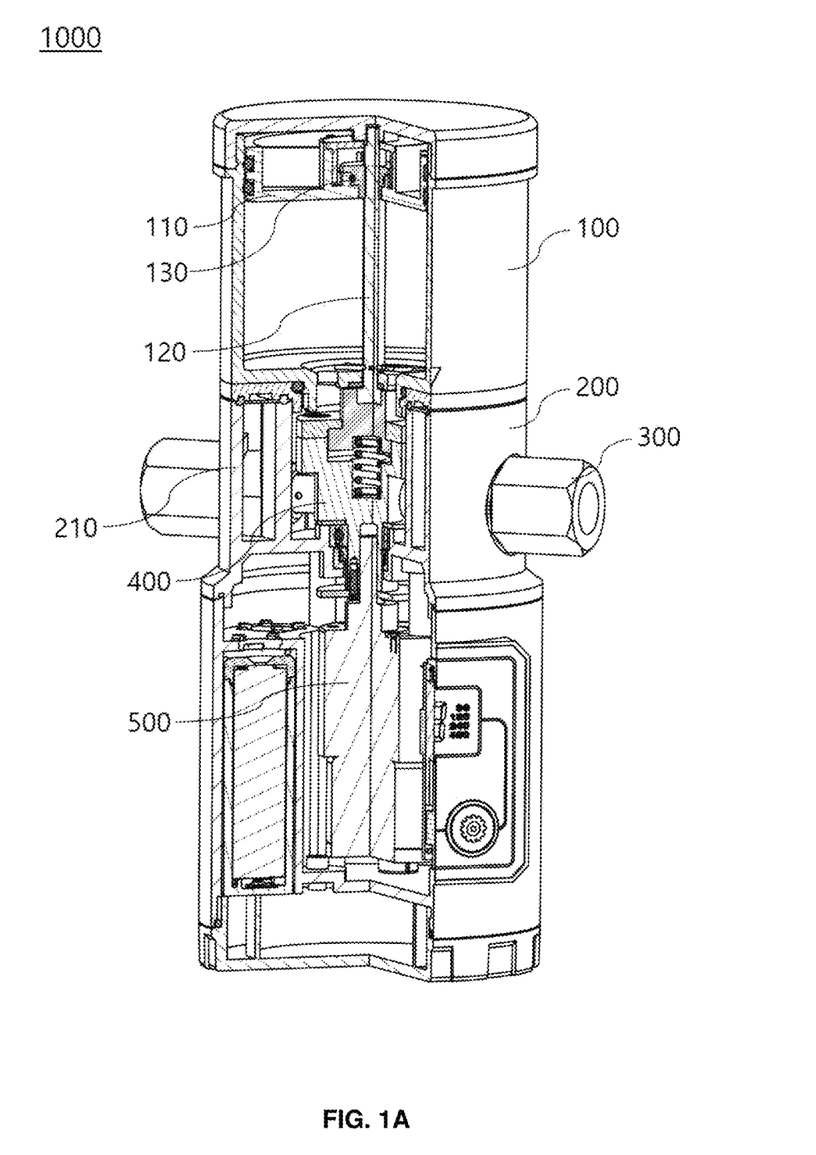
FIGS. 1A and 1B are partially cutaway perspective views of an oil injection apparatus according to one embodiment of the invention.
Figure 1B:
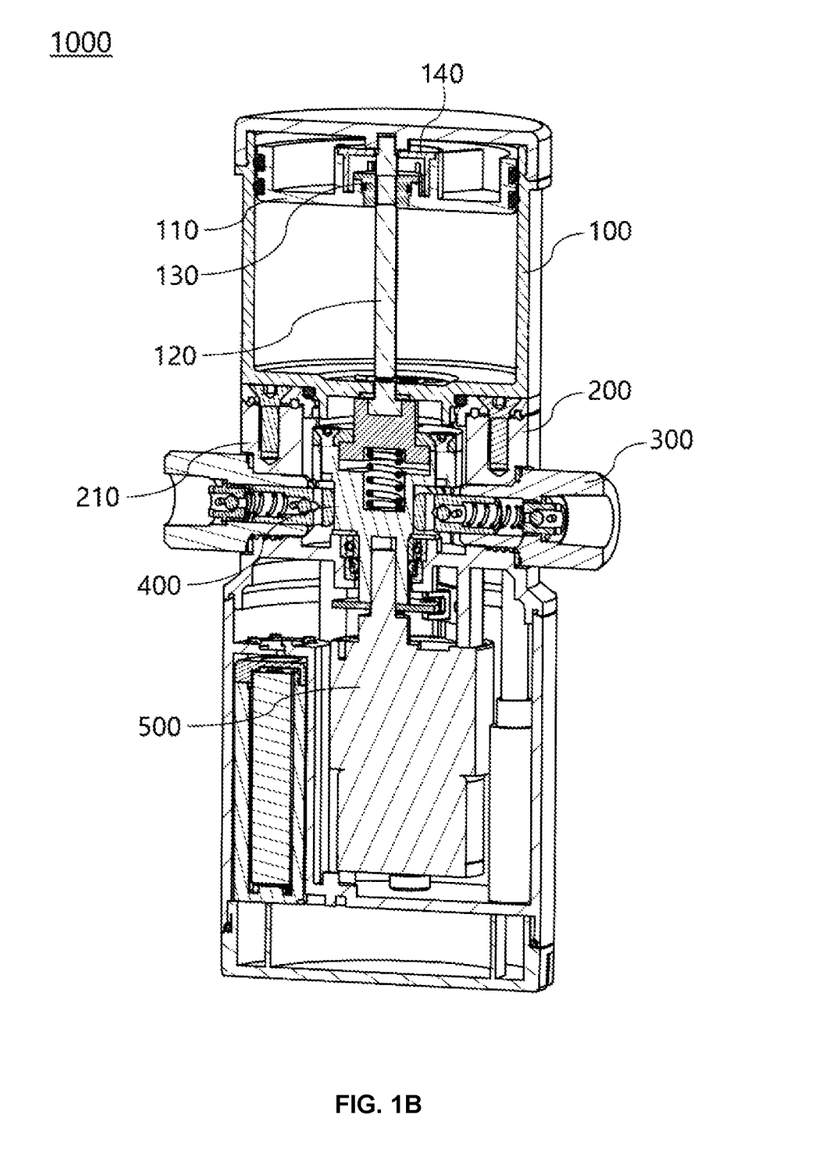

FIGS. 1A and 1B are partial cutaway perspective views illustrating an oil injection apparatus according to one embodiment of the invention.

With reference to FIGS. 1A and 1B, an oil injection apparatus 1000 includes a storage unit 100, a discharge unit 200, a discharge pump assembly 300, a driving unit 400, and a driving force generator 500.

The storage unit 100 is filled with lubricating oil to be discharged to a place where mechanical friction occurs. The storage unit 100 can extrude the lubricating oil stored therein into the discharge unit 200 through an ejection hole formed in the bottom thereof. To this end, the inside of the storage unit 100 is provided with a piston 110 and a screw shaft 120. That is, for example, when the screw shaft 120 provided with a threaded outer surface is rotated in one direction, the piston 110 engaged with the screw shaft 120 in a screwed manner moves down along the screw shaft 120, thereby compressing the lubricating oil stored in the storage unit 100 to extrude the lubricating oil into the discharge unit 200 through the ejection hole. The storage unit 100 may have, for example, a cylinder shape but may not be limited thereto. In addition, an outer housing of the storage unit 100 has a transparent portion that allows an operator to check for the remains of the lubricating oil therein.

In the present embodiment, the storage unit 100 is provided in the form of a module. Therefore, the storage unit 100 can be detachably attached to an upper portion of the discharge unit 200 and replaced as necessary. In this case, the outer housing of the storage unit 100 is sealed to prevent the storage unit 100 from being replenished with uncertified lubricating oil.

The discharge unit 200 temporarily stores the lubricating oil transported from the storage unit 100, and then discharges the lubricating oil according to a pumping operation of the discharge pump assembly 300. The discharge unit 200 may have a chamber 210 defined therein. The chamber 210 functions to combine the discharge pump assembly 300 and the driving unit 400 with each other. As described below, the driving unit 400 rotates in the chamber 210. When the driving unit 400 rotates, the driving unit 400 presses an end of the discharge pump assembly 300, thereby causing the discharge pump assembly 300 to pump out the lubricating oil.

The discharge pump assembly 300 can discharge the lubricating oil out of the discharge unit 200 through the pumping operation thereof. The discharge pump assembly 300 includes a plurality of discharge pumps 300. The discharge pumps 300 are arranged at regular intervals on the surface of the discharge unit 200, with first ends thereof disposed in the discharge unit 200. For example, the number of the discharge pumps 300 is four. The four discharge pumps 300 are arranged at regular intervals (i.e. intervals of 90°) in a circumferential direction of the discharge unit 200 while the first ends (for example, piston portions) are disposed in the discharge unit 200 and connected to the chamber 210. The detailed structure and operation of the discharge pump 300 will be described below with reference to FIGS. 4A to 7B.

The driving unit 400 is provided in the chamber 210 of the discharge unit 200. One end of the driving unit 400 is connected directly or indirectly via a gear to the driving force generator 500, thereby transferring driving force to the screw shaft 120 and the discharge pumps 300. Specifically, at least part of the driving unit 400 receives rotational force from the driving force generator 500, whereby the driving unit 400 can be rotated. When the driving unit is rotated, a portion of the driving unit 400 sequentially presses the first ends of the discharge pumps 300. As a result, the discharge pumps 300 perform, in turn, pumping operation. The detailed structure of the driving unit 400 will be described below with reference to FIGS. 2A to 3B.

The driving force generator 500 is provided under the discharge unit 200 and provides rotational force to the driving unit 400. Preferably, the driving force generator 500 may be an electric motor. The driving force generator 500 is arranged to extend in a longitudinal direction of the driving unit 400, i.e. in a vertical direction. For example, an end of the driving unit 400 is connected, directly or indirectly via a gear, to a shaft of an electric motor.

The oil injection apparatus 1000 may further include a power supply unit (not denoted by a reference numeral), a control panel (not denoted by a reference numeral), etc. The power supply unit supplies electric power to operate the driving force generator 500, the control panel, etc. For example, the power supply unit may be implemented in a manner that it is connected to an external power supply or in the form of a battery. The control panel can perform control for switching on and off the driving force generator 500 according to a user's operation, for adjustment of an operation speed, etc. The control panel includes a display part that displays an operation state of the oil injection apparatus 1000, an input part (button, etc.) to receive a user's operation, etc.

Figure 2A:
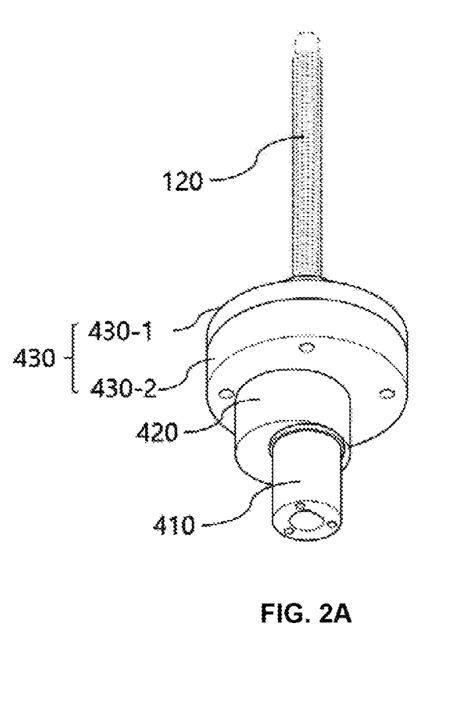
FIGS. 2A and 2B illustrate a driving unit of the oil injection apparatus according to the embodiment of the invention.
Figure 2B:
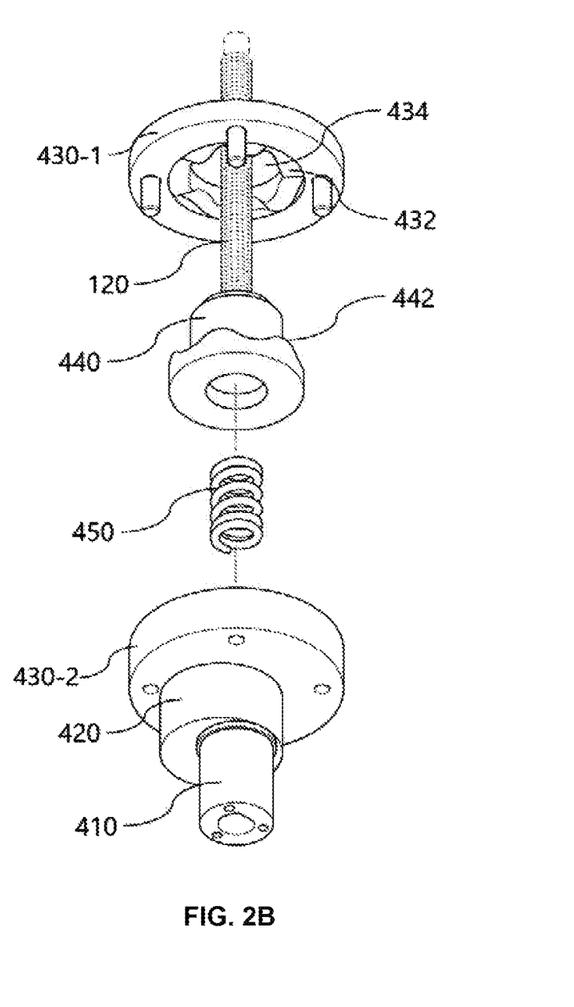

FIGS. 2A and 2B illustrate the driving unit of the oil injection apparatus according to the embodiment of the invention.

With reference to FIGS. 2A and 2B, the driving unit 400 includes a rotary body 410, a pressurizing rotor 420, a coupling part 430, a rotary motion transfer part 440, and an elastic support 450.

The rotary body 410 is connected to the driving force generator 500. Thus, the rotary body 410 can receive rotational force from the driving force generator 500. To this end, an end of the rotary body 410 is provided with a polygonal recess in which the shaft of the driving force generator 500 can be received.

Preferably, the pressurizing rotor 420 has a cylinder shape and performs eccentric rotary motion according to rotation of the rotary body 410. For example, as illustrated in FIGS. 2A and 2B, the pressurizing rotor 420 is arranged to asymmetrically protrude from the circumferential surface of the rotary body 410. For this reason, a rotation axis of the rotary body 410 is misaligned with the center of the pressurizing rotor 420. Therefore, the pressurizing rotor 420 can be eccentrically rotated according to the rotation of the rotary body 410. Through this eccentric rotary motion, the pressurizing rotor 420 can sequentially press the first ends of the discharge pumps 300, which are closely located to the pressurizing rotor 420 and disposed in the chamber 210 of the discharge unit 200.

The coupling part 430 is provided at an upper end of the pressurizing rotor 420 and accommodates the rotary motion transfer part 440 combined with an end of the screw shaft 120, thereby connecting the screw shaft 120 and the driving unit 400 with each other.

The coupling part 430 consists of an upper plate 430-1 and a lower plate 430-2. The upper plate 430-1 has a through hole 434 in which a portion of the rotary motion transfer part 440 is received and through which the screw shaft 120 passes. To this end, as illustrated in FIGS. 2A and 2B, the upper plate 430-1 has a ring shape. The upper plate 430-1 has a first gear 432 that protrudes downward from the lower surface thereof and which is provided along the periphery of the through hole 434. The first gear 432 meshes with a second gear 442 formed on an upper portion of the rotary motion transfer part 440, thereby transferring the rotational force of the driving unit 400 to the screw shaft 120. On the other hand, the lower plate 430-2 has a through hole or a recess to serve as an accommodation space at the center thereof. The rotary motion transfer part 440 and the elastic support 450 can be received in the accommodation space.

The rotary motion transfer part 440 is combined with one end of the screw shaft 120, thereby transferring the rotational force of the driving unit 400 to the screw shaft 120. To this end, the second gear 442 that protrudes upward from the upper surface of the rotary motion transfer part 440 and which is provided along the periphery of the rotary motion transfer part 440 meshes with the first gear 432 of the coupling part 430. That is, when the coupling part 430 connected to the rotary body 410 and the pressurizing rotor 420 is rotated, this rotational force is transferred via the second gear 442 that is in mesh with the first gear 432, and thus the screw shaft 120 combined with the rotary motion transfer part 440 is rotated in a direction reverse to the rotation direction of the driving unit 400.

The elastic support 450 is arranged under the rotary motion transfer part 440 and provides elastic force to the rotary motion transfer part 440. Due to the elastic force of the elastic support 450, the second gear 442 of the rotary motion transfer part 440 can be in or out of mesh with the first gear 432 according to the internal pressure of the discharge unit 200. Details of this operation will be described below with reference to FIGS. 3A and 3B. As the elastic support 450, various members with elasticity can be used. Preferably, a spring can be used as the elastic support 450.

Figure 3A:
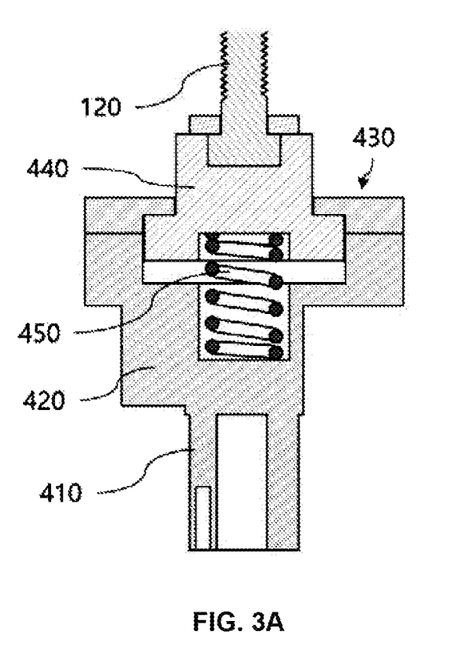
FIGS. 3A and 3B illustrate exemplary operation states of a screw shaft and the driving unit of the oil injection apparatus according to the embodiment of the invention.
Figure 3B:
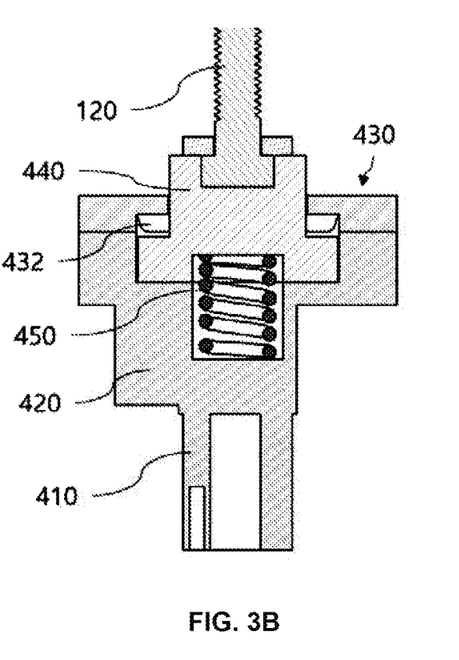

FIGS. 3A and 3B illustrate exemplary operation states of the screw shaft and the driving unit of the oil injection apparatus according to the embodiment of the invention.

With reference to FIGS. 3A and 3B, the screw shaft 120 can intermittently receive rotational force from the driving unit 400 according to the internal pressure of the discharge unit 200. The internal pressure of the discharge unit 200 is determined depending on a difference between the amount of lubricating oil extruded from the storage unit 100 and the amount of lubricating oil pumped out through the pumping operation of the discharge pump 300.

That is, as illustrated in FIG. 3A, when the rotary body 410 and the coupling part 430 simultaneously rotate in the state in which the first gear 432 of the coupling part 430 is in mesh with the second gear 442 of the rotary motion transfer part 440, the rotary motion transfer part 440 and the screw shaft 120 that are combined with each other rotate in the same direction as the rotation direction of the coupling part 430, whereby the piston 110 provided in the storage unit 100 moves down to compress the lubricating oil. Thus, the compressed lubricating oil is extruded into the discharge unit 200. When the lubricating oil is extruded, the pressurizing rotor 420, which rotates according to the rotation operation of the rotary body 410, causes the multiple discharge pumps 300 to perform a pumping operation in turn. Thus, the lubricating oil can be discharged outside through a discharge channel formed in the discharge pump 300.

When there is a difference between the amount of lubricating oil introduced into the discharge unit through extrusion and the amount of lubricating oil discharged out of the discharge unit through pumping, the internal pressure of the discharge unit 200 rises. In this case, when the force pressing the rotary motion transfer part 440 that is exposed outside the coupling part 430 becomes stronger than the elastic force of the elastic support 450, as illustrated in FIG. 3B, the elastic support 450 is compressed, whereby the rotary motion transfer part 440 moves down. In addition, the first gear 432 is out of mesh with the second gear 442, transfer of the rotational force to the screw shaft 120 is interrupted, and the pressing force applied to the piston 110 is eliminated. On the other hand, when the internal pressure of the discharge unit 200 drops to or below a predetermined value, the rotary motion transfer part 440 moves up due to the recovery force of the elastic support 450. Thus, the first gear 432 becomes in mesh with the second gear 442 again, and the rotational force can be transferred to the screw shaft 120 again.

In this way, in the oil injection apparatus 1000 according to the embodiment of the invention, the first gear 432 and the second gear 442 are intermittently in and out of mesh with each other to perform a clutch function, thereby preventing stagnation of lubricating oil in the oil injection apparatus 1000.

Figure 4A:
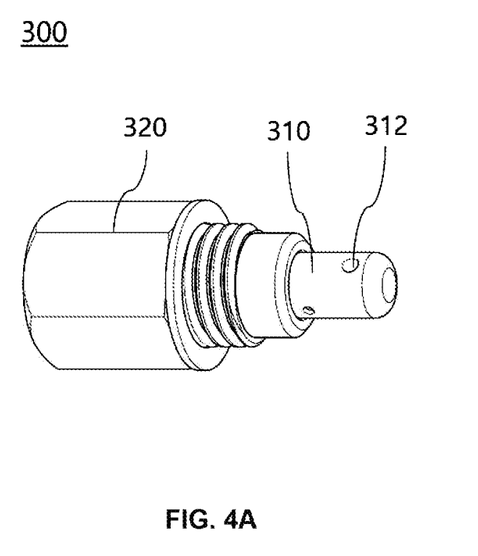
FIGS. 4A and 4B illustrate a discharge pump of the oil injection apparatus according to the embodiment of the invention.
Figure 4B:
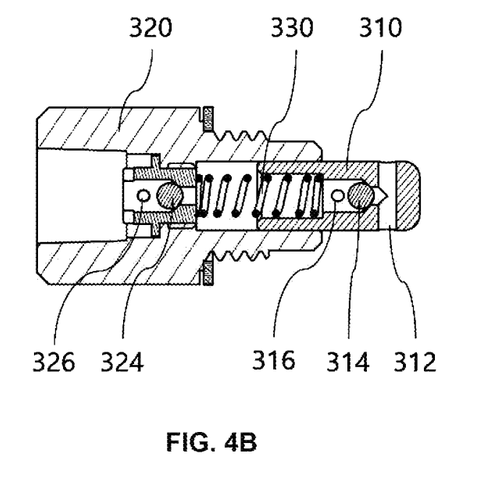
Figure 5:
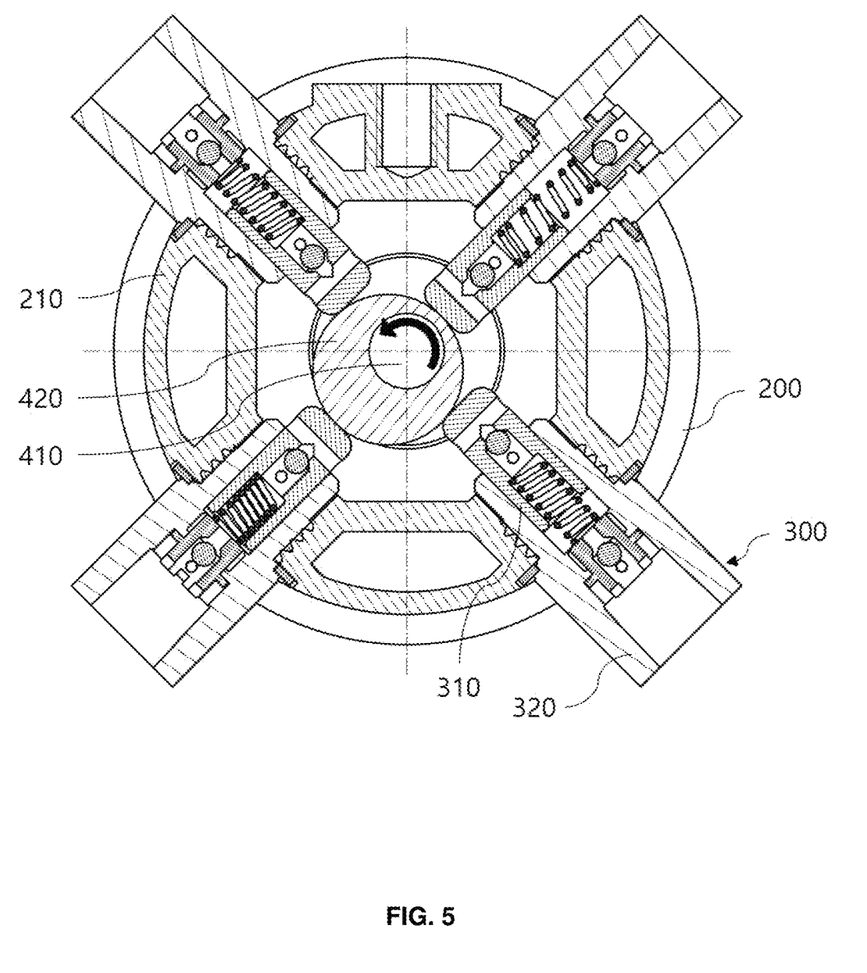
FIG. 5 is a view illustrating a combined structure of a discharge unit and the discharge pump of the oil injection apparatus according to the embodiment of the invention.

FIGS. 4A and 4B illustrate the discharge pump of the oil injection apparatus according to the embodiment of the invention. FIG. 5 illustrates a combined structure of the discharge unit and the discharge pump of the oil injection apparatus according to the embodiment of the invention.

Referring to FIGS. 4A and 4B, the discharge pump 300 includes a piston 310, a cylinder 320, and a spring 330.

The piston 310 is combined with the cylinder 320 such that at least part of the piston 310 can be moved inward and outward in the cylinder 320. When the piston 310 is moved inward or outward in the cylinder, the lubricating oil is introduced into the discharge pump 300 or pumped out to flow in a first direction. Here, the term "first direction" means a direction directed to an exposed end (i.e. second end) of the cylinder 320. When one end (i.e. first end) of the piston 310 is pressed by the pressurizing rotor 420 while the pressurizing rotor 420 is rotating, the piston 310 is moved inward in the cylinder 320. Afterwards, when the rotation of the pressurizing rotor 420 has further progressed, the force of pressing the piston is eliminated. At this point, the piston can be moved outward in the cylinder 320. Through this reciprocating motion (inward and outward movement) of the piston 310, the discharge pump 300 pumps the lubricating oil out of the discharge unit 200 in the first direction.

The piston 310 also has an intake hole 312 at one end portion thereof. The intake hole 312, a channel defined in the piston 310, and a channel defined in the cylinder 320 are connected to provide an oil discharge path through which the lubricating oil can be discharged outside.

The cylinder 320 is a hollow body and the first end (disposed at the opposite side of the piston 310) of the cylinder 320 is exposed outside the oil injection apparatus. Thus, the lubricating oil pumped by the piston 310 can be discharged to an outside location (destination) from the second end of the cylinder 320.

The channel formed in the piston 310 and the cylinder 320 is provided with at least one check valve 324 or 314 to prevent backflow of the lubricating oil, i.e., prevent the lubricating oil from flowing in a section direction that is reverse to the first direction. According to one embodiment of the invention, the at least one check valve 324 or 314 may consist of a first check valve 314 and a second check valve 324. The first check valve 314 is provided in the channel of the piston 310 and arranged to be close to the intake hole 312. The first check valve 314 can open and close the intake hole 312 according to the reciprocating motion of the piston 310. The second check valve 324 is provided in the channel of the cylinder 320 and is arranged to be spaced from one end of the piston 310 by a predetermined distance when the piston 310 is most deeply moved inward in the cylinder 320. The second check valve 324 can open and close the channel of the cylinder 320 according to the reciprocating motion of the piston 310. In addition, fixed members 326 and 316 are provided in the channel, at one side of the first check valve 314 and the second check valve 324 in the first direction. The fixed members 326 and 316 limit movement ranges of the check valves 324 and 314 in the first direction.

The spring 330 is provided in the discharge pump 300 and applies elastic force, in the second direction, to the piston 310. Specifically, an end of the spring 330 is connected to an internal portion of the cylinder 320 and the other end of the spring 330 is connected to an internal portion of the piston 310, thereby providing elastic force acting in the second direction. Due to the elastic force of the spring 330, when the force of the pressurizing rotor 420 that presses the piston 310 is eliminated, the piston is moved outward in the cylinder 320.

With reference to FIG. 5, the discharge pump assembly 300 consists of multiple discharge pumps. The discharge pumps are arranged at regular intervals in a circumferential direction of the discharge unit 200 and/or the chamber 210.

In each discharge pump 300, the first end of the piston 310 is disposed inside the chamber 210 and is in tight contact with the pressurizing rotor 420 arranged at the center of the chamber 210. Accordingly, when the pressurizing rotor 420 performs eccentric rotary motion, the pistons 310 of the discharge pumps 300 are pressed and then released to perform a pumping operation, in turn. Since the pistons 310 are sequentially pressed by the pressurizing rotor 420, some of the discharge pumps 300 simultaneously take in the lubricating oil and the other discharge pumps 300 simultaneously pump out the lubricating oil. The pumping operation of the discharge pumps 300 can be repeatedly performed in this way.

FIGS. 6A to 7B illustrate exemplary operation states of the discharge pump of the oil injection apparatus according to the embodiment of the invention. Specifically, FIGS. 6A to 7B illustrate an operation state in which the piston is pressed and an operation state in which the piston is released, respectively.

Figure 6A:
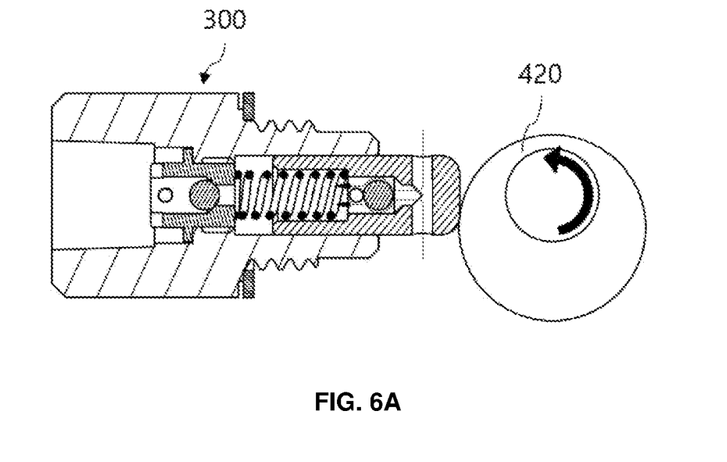
Figure 6B:
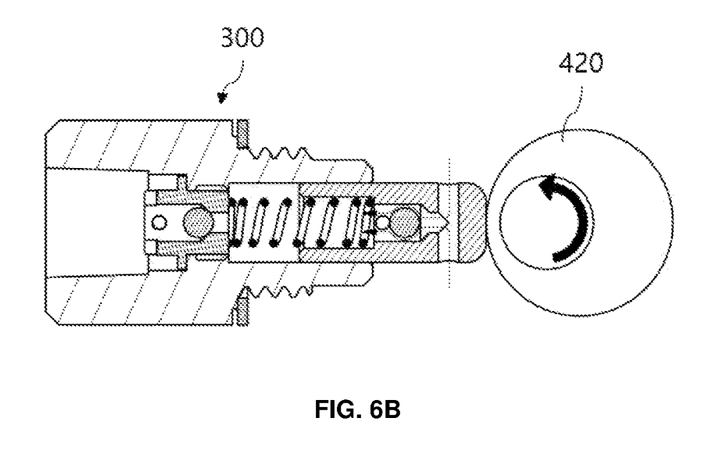

With reference to FIGS. 6A and 6B, when the piston 310 is gradually released from the state in which the pressurizing rotor 420 presses the piston 310, the piston 310 is moved outward in the cylinder 320 due to the recovery force of the spring 330. Thus, the pressure of the channel between the first check valve 314 and the second check valve 324 decreases. Therefore, the first check valve 314 moves in the first direction (i.e. toward the cylinder) and the second check valve 324 moves in the second direction (i.e., toward the piston). As a result, the first check valve 314 opens the intake hole 312 such that the lubricating oil can be introduced into the discharge pump 300 through the intake hole 312. On the other hand, the second check valve 324 closes the channel of the cylinder 320, thereby preventing the lubricating oil being present outside the cylinder 320 from flowing back into the discharge pump 300, which occurs due to decrease in internal pressure.

Figure 7A:
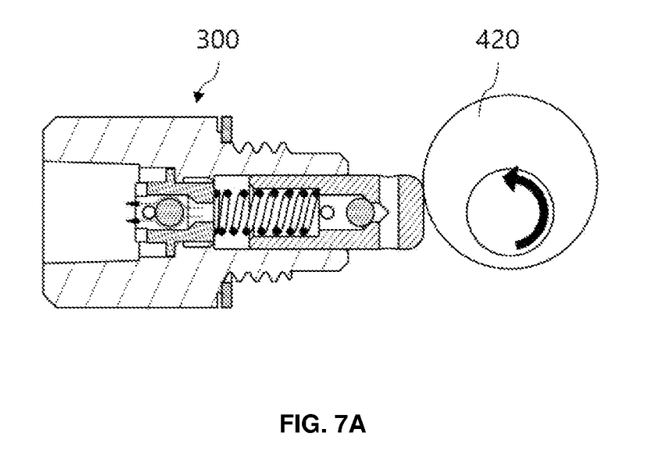
Figure 7B:
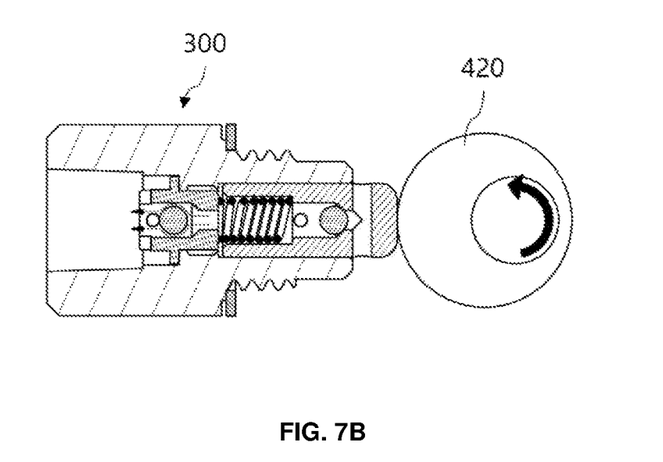

Subsequently, as illustrated in FIGS. 7A and 7B, the pressurizing rotor 420 presses the first end of the piston 310. Therefore, the piston 310 is moved inward in the cylinder 320, resulting in an increase in the internal pressure of the channel between the first check valve 314 and the second check valve 324. Thus, the first check valve 314 and the second check valve 324 move in the second direction and the first direction, respectively. In this case, the first check valve 314 closes the intake hole 312, thereby preventing the backflow of the lubricating oil from the discharge pump 300 to the discharge unit 200, and the second check valve 324 opens the channel of the cylinder 320 so that the introduced lubricating oil can be discharged out of the discharge pump 300.

Figure 8A:
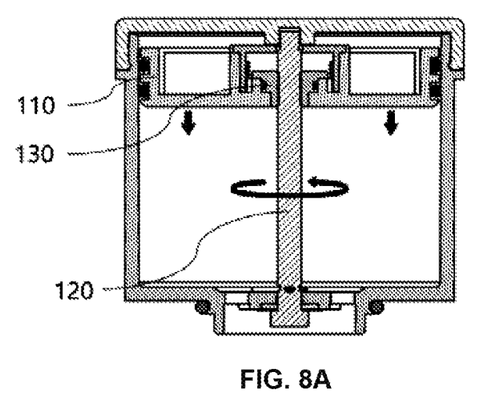
FIGS. 8A to 8C illustrate exemplary operation states of a storage unit of the oil injection apparatus according to the embodiment of the invention.
Figure 8B:
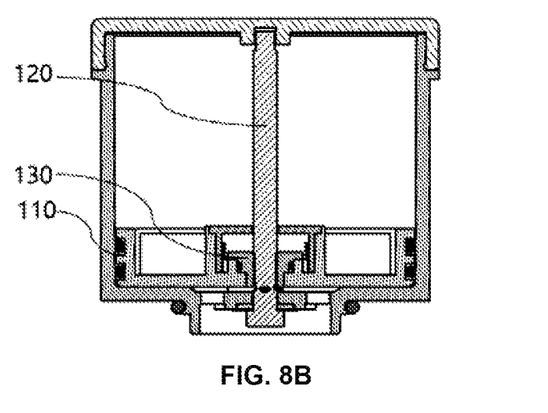
Figure 8C:
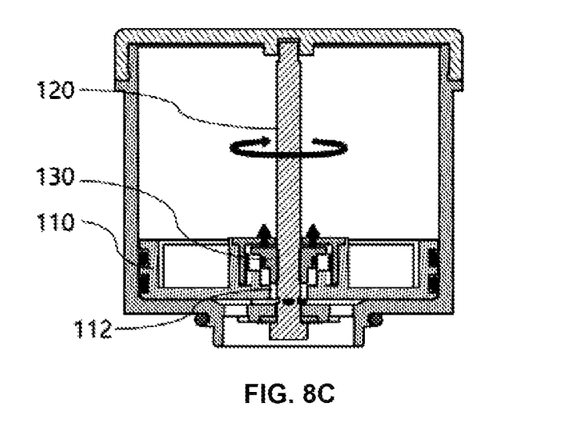

FIGS. 8A to 8C illustrate exemplary operation states of the storage unit of the oil injection apparatus according to the embodiment of the invention.

With reference to FIGS. 8A to 8C, the piston 110 and the screw shaft 120 provided in the storage unit 100 are combined by a nut member 130.

Specifically, the nut member 130 has a threaded central through hole. Therefore, the screw shaft 120 can engage with the nut member 130 in a rotatable manner by passing through the through hole of the nut member 130. In addition, an upper portion of the piston 110 is provided with an engagement recess 112 to engage with a protrusion provided at a lower end of the nut member 130. The piston 110 and the screw shaft 120 detachably combine with each other in a manner that the protrusion of the nut member 130 is partially inserted into the engagement recess 112 of the piston. The protrusion of the nut member 130 and the engagement recess 112 of the piston have a cross section having a polygonal shape to facilitate transfer of rotational force.

Meanwhile, according to one embodiment, the storage unit 100 may be further provided with a piston cap 140 combined with the upper surface of the piston 130, to encase the nut member 130. For example, when at least part of the housing of the storage unit 100 is made of a transparent material, the piston cap 140 can prevent the engagement and disengagement of the nut member 130 and the engagement recess 112, which occur according to the rotation of the screw shaft 120, from being seen from outside.

Referring to FIGS. 8A to 8C, operation of the piston 110 and the screw shaft 120 will be summarized below.

First, as illustrated in FIG. 8A, the protrusion of the nut member 130 is inserted into the engagement recess 112 of the piston 110 such that engagement of the piston 110 and the screw shaft 120 is maintained. Next, the screw shaft 120 is rotated in the first direction (for example, counterclockwise direction) such that the piston 110 engaged with the screw shaft 120 moves down and the nut member 130 also moves, thereby compressing the lubricating oil in the storage unit 100 downward. At this point, as illustrated in FIG. 8B, the piston 110 moves down up to the bottom of the storage unit 100 such that the lubricating oil is completely extruded into the discharge unit 200.

Meanwhile, if a user rotates the screw shaft 120 in the second direction reverse to the first direction, as illustrated in FIG. 8C, the protrusion of the nut member 130 moves up and escapes from the engagement recess 112 of the piston 110. Accordingly, the piston 110 disengages from the screw shaft 120. In this state, the piston 110 does not move upward although the screw shaft 120 is rotated.

With the structure and operation described above, the oil injection apparatus 1000 according to the present invention can prevent the storage unit 100 from being replenished with uncertified lubricating oil after the lubricating oil in the storage unit 100 is completely consumed, through forced manipulation of the piston 110.

Hereinabove, preferred embodiments have been disclosed in the detailed description and drawings. The words and terms used herein are words or terms for description rather than limitation, and those skilled in the art will appreciate that various modifications and equivalents are possible, without departing from the spirit of the invention. Accordingly, the substantial protection scope of the present invention is defined only by the accompanying claims.

What is claimed is:

1. An oil injection apparatus comprising:
    a storage unit for extruding lubricating oil stored therein through an ejection hole formed therein;
    a discharge unit adapted to communicate with the storage unit through the ejection hole and discharge the lubricating oil supplied from the storage unit out of the discharge unit in reply to a pumping operation;
    a plurality of discharge pumps arranged at intervals and extending in a radial direction of the discharge unit, each of said discharge pumps having a piston slidably coupled to a cylinder, wherein the piston is positioned at a radially inner side of the discharge unit and includes at least one intake hole for taking the lubricant oil therethrough, and wherein the cylinder is positioned at a radially outer side of the discharge unit and has an oil discharge port at a distal portion thereof, the cylinder and the piston being in fluid communication with each other and configured to discharge the lubricating oil through the discharge port of the cylinder upon operation; and
    a driving unit adapted to rotate relative to a central axis, the driving unit including a pressurizing rotor having an outer cam surface eccentrical to the central axis of the driving unit so as to sequentially press the pistons of the discharge pumps upon rotation, thereby causing the lubricating oil introduced through the intake hole of the respective pistons to be sequentially pumped out and discharged through the discharge port of the respective cylinders.

2. The oil injection apparatus according to claim 1, wherein the piston and the cylinder provide a channel through which the lubricating oil is discharged, and at least one check valve is provided in the channel to prevent the lubricating oil from flowing backwardly from a discharging direction.

3. The oil injection apparatus according to claim 2, wherein the at least one check valve comprises: a first check valve provided in the channel of the piston and disposed to be close to the intake hole; and a second check valve provided in the channel of the cylinder and adapted to be spaced from the piston in a first direction toward a distal end of the cylinder when the piston is most deeply moved inward in the cylinder, and wherein when the piston is moved inward in the cylinder, the first check valve moves in a second direction opposite from the first direction to close the intake hole, and the second check valve moves in the first direction to open the channel of the cylinder.

4. The oil injection apparatus according to claim 3, wherein when the piston is moved outward in the cylinder, the first check valve moves in the first direction to open the intake hole and the second check valve moves in the second direction to close the channel of the cylinder.

5. The oil injection apparatus according to claim 3, wherein the discharge pump further comprises a spring having one end connected to an internal portion of the cylinder and the other end connected to an internal portion of the piston, the spring providing elastic force acting in the second direction reverse to the first direction.

6. The oil injection apparatus according to claim 2, wherein a fixed member is provided at one side of the check valve in the first direction to limit a movement range of the check valve.

7. The oil injection apparatus according to claim 1, wherein the driving unit comprises a rotary body connected to a driving force generator to receive rotational force; and wherein the pressurizing rotor is eccentrically protruded from an outer circumferential surface of the rotary body to sequentially press the pistons of the discharge pumps by eccentrically rotating according to rotation of the rotary body.

8. The oil injection apparatus according to claim 1, wherein the storage unit includes a screw shaft configured to rotate with the driving unit and a compressing piston engaged with the screw shaft, wherein the compressing piston is adapted to move toward the discharge unit in response to the rotation of the screw shaft in a first direction, thereby compressing the lubricating oil in the storage unit.

9. The oil injection apparatus according to claim 8, wherein when the screw shaft is rotated in a second direction reverse to the first direction, the compressing piston disengages from the screw shaft, thereby not moving back and forth in response to the rotation of the screw shaft.

10. The oil injection apparatus according to claim 9, wherein an upper surface of the compressing piston is provided with an engagement recess,
    wherein when a protrusion protruding from a lower surface of a nut member provided to rotate along an outer circumferential surface of the screw shaft is inserted into the engagement recess, the screw shaft engages with the compressing piston, and
    wherein when screw shaft is rotated in the second direction, the protrusion of the nut member escapes from the engagement recess, thereby causing the compressing piston to disengage from the screw shaft.

11. The oil injection apparatus according to claim 10, wherein the protrusion of the nut member and the engagement recess have a cross section having a polygonal shape.

* * * * *